Dec. 12, 1967

H. A. BEALL, JR 3,357,298

STAR TRACKER INCLUDING ANGULARLY DISPOSED
PHOTOELECTRIC STRIP SURFACES

Filed June 19, 1963

INVENTOR.
HORACE A BEALL JR.

BY

*Ernest L. Brown*
ATTORNEY

Dec. 12, 1967 H. A. BEALL, JR 3,357,298
STAR TRACKER INCLUDING ANGULARLY DISPOSED
PHOTOELECTRIC STRIP SURFACES
Filed June 19, 1963 4 Sheets-Sheet 4

INVENTOR.
HORACE A. BEALL JR.
BY
Ernest L. Brown
ATTORNEY

United States Patent Office 3,357,298
Patented Dec. 12, 1967

3,357,298
STAR TRACKER INCLUDING ANGULARLY DISPOSED PHOTOELECTRIC STRIP SURFACES
Horace A. Beall, Jr., Los Alamitos, Calif., assignor to North American Aviation, Inc.
Filed June 19, 1963, Ser. No. 289,122
2 Claims. (Cl. 88—1)

ABSTRACT OF THE DISCLOSURE

A star tracker having narrow converging photosensitive surfaces located in the focal plane of a telescope adapted for dithering about a single axis. As the telescope reciprocates, the star image crosses the converging photosensitive surfaces and the time duration between crossings is indicative of the angular location of the star in a plane perpendicular to the trajectory of the image. In another embodiment, two converging pairs of parallel photosensitive strips are used. A bridge circuit is used to combine differentially the outputs of each pair of strips; the time duration between the occurrence of the differentially combined outputs is indicative of the position of the star image.

---

This invention pertains to a star tracker and more particularly to a star tracker which uses a novel configuration of photoelectric sensing means.

In automatic navigation systems gyroscopically stabilized platforms are frequently used. Because of the drift of the gyroscopes, the gyroscopes are frequently corrected or trimmed by means of an automatic star tracker. Assuming that the position coordinates of the supporting vehicle are known within a small error and assuming that the gyroscopically stabilized platform very closely establishes the direction of the coordinates of a predetermined coordinate system, and assuming that the time is known, a telescope may automatically be pointed in the known direction of a predetermined star. When the telescope is pointed at the star, a star image is formed on the focal plane of the telescope. The star image is substantially a point. Because of errors in the gyroscopically stabilized system, the telescope does not point exactly at the predetermined star. However, the guidance system including the gyroscopically stabilized supporting platform may be sufficiently accurate to cause the star to be within the field of view of a relatively small telescope.

The star image on the focal plane of the telescope must not only be detected but also its direction and distance form a predetermined point on the focal plane (usually the optical axis of the telescope) must be determined In the presence of spurious light such as day light, light reflected from clouds, and the like, it has in the past been difficult to detect the position of the star image. Frequently the intensity of the background light is as great or greater than the intensity of the star image. For example, in the direction of the sun the light intensity of the sun is greater than the light intensity of a star.

In the past, the field of view has been chopped or scanned to determine the gradient of the light. When the gradient is very high, a star image is probably detected. However, because the signal of the star image is so small relative to the signal generated by the background light, long system time constants have been needed to establish that a detected signal indeed represents a star image.

The device contemplated by this invention uses a plurality of spaced-apart photoelectric surfaces on the focal plane of the telescope. The telescope is rocked or dithered to cause the light field and hence the star image consecutively to cross the photoelectric surfaces. When the first surface is crossed by a star image, a gate opens for a short period of time whereby when the star image, intercepts the second photoelectric surface a signal is generated indicating the presence of the star image. The last mentioned signal opens a gate to cause the telescope position to be recorded thereby indicating the direction of the detected star.

In a second embodiment, the telescope is first rocked in one direction and when the first surface is crossed by a star image, a gate opens for a short period of time whereby when the star image intercepts the second photoelectric surface, a signal is generated indicating the presence of the star image. The telescope is then rocked in the opposite direction and a second star image signal is generated. This process is then repeated. The signals so generated are then applied to a timing circuit which is operative to determine whether the time spacing between the first and second star image signals equals the time spacing between the second and first star image signals. In other words, when the pulse repetition frequency becomes constant, if the dither motion were to cease, the star's image would be centered. A conventional follow-up servo system may be employed to detect any inequality in the pulse repetition frequency and to provide a signal to reorient the telescope until the pulse repetition frequency becomes constant.

To stabilize the telescope about two axes, two pair of photoelectric surfaces are positioned on the focal plane of the telescope with an orientation so that when the telescope is deflected consecutively about the first axis then about a second axis, the trajectory of the star image crosses a first pair of photocells to determine the first coordinate of the star then crosses a second pair of photocells to determine the second coordinate of the star.

In another embodiment of this invention four strips of photoelectric material project radially from a point (usually the optical axis of the telescope) on the focal plane of the telescope. The four strips are angularly displaced 90° apart. The telescope is dithered to cause the star image to move in a circle. Opposite pairs of the strips of the photoelectric material are connected in a circuit to generate pulses which indicate the timing of the interception of a star image with the individual strips of photoelectric material.

In another embodiment of this invention two pair of parallel strips of photoelectric material are positioned on the focal plane of a telescope, the two pair forming an angle relative to each other. The angle between the two pair of photoelectric strips is substantially larger than 0° and substantially less than 90° so that motion of the telescope about one axis perpendicular to one pair of strips of photoelectric material generates electrical signals whose time sequence is a measure of the displacement of the star image in a direction perpendicular to its trajectory across the focal plane of the telescope.

In each of the embodiments the photoelectric material is preferably a surface supported by a substrate member.

In a preferred embodiment of this invention the substrate member is ceramic or glass and the photoelectric surfaces are cadmium sulfide. The electrical connectors to the cadmium sulfide surfaces are preferably indium or tin, but may be gold or gold alloy.

It is therefore an object of this invention to more accurately detect the presence of a star image on the focal plane of a telescope.

It is a more particular object of this invention to determine the direction of a star relative to a telescope.

It is also an object of this invention to determine the distance and direction of a star image on the focal plane of a telescope relative to the optical axis of the telescope.

It is a more specific object of this invention to provide apparatus which is adapted to achieve the above enumerated objects.

Other objects will become apparent from the following description taken in connection with the accompanying drawings in which.

Figure 1:
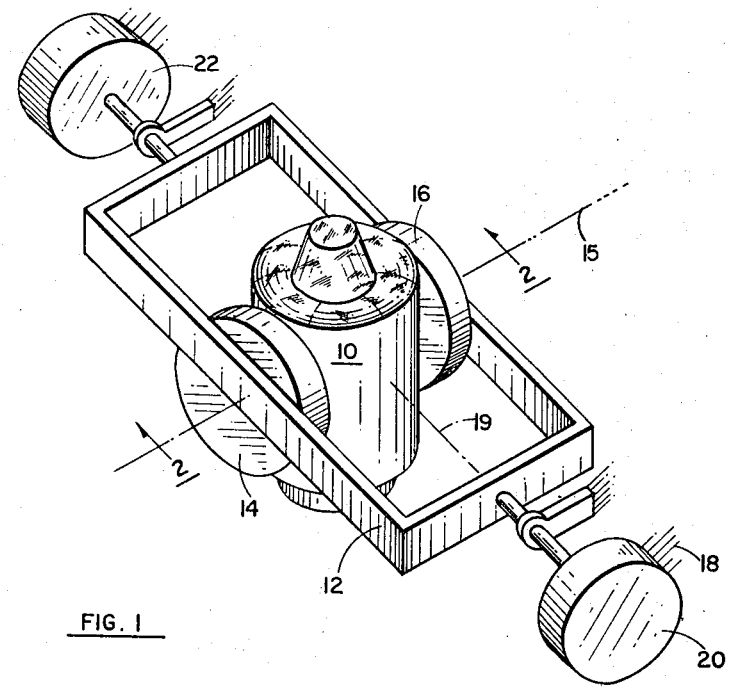
FIGURE 1 is an oblique view of a telescope supported for two degrees of freedom.

In FIGURE 1, a telescope 10 is supported about a first axis relative to gimbal 12. An angular pick-off 14 is adapted to measure the angular position of telescope 10 relative to gimbal 12. A motor 16, which may be a pulsed motor, is adapted to position telescope 10 relative to gimbal 12. Gimbal 12 is mounted for angular rotation relative to reference frame 18 about an axis which is perpendicular to the axis of the pick-off 14 and motor 16. Motor 20 is adapted to rotate gimbal 12 relative to reference frame 18. An angular pick-off or sensor 22 is adapted to generate a signal which is a measure of the angular relation between gimbal 12 and reference frame 18.

Reference frame 18 may be—for example—a gyroscopically stabilized platform which is locally vertical. Alternatively, reference frame 18 might be the frame of a supporting vehicle.

Figure 2:
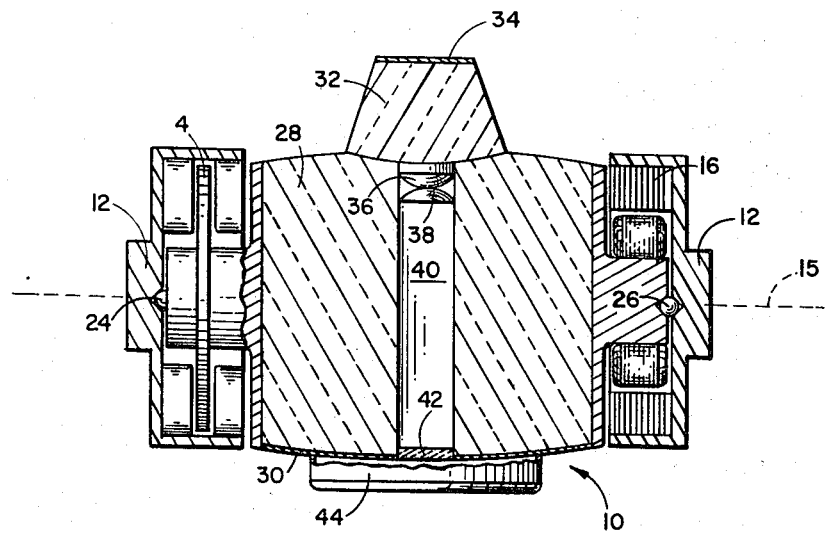
FIGURE 2 is a view, partially in section, taken at 2—2 in FIGURE 1.

As shown in FIGURE 2, telescope 10 is typically mounted relative to gimbal 12 upon a pair of ball and pivot bearings 24 and 26.

The optical portion of the telescope comprises an annular solid telescope body 28 having a mirrored back surface 30 which is curved to reflect a star image toward the optical axis of the telescope into a central body 32 which has a mirrored surface 34. Central body 32 is adapted to rest upon member 28 and to form a cohesive surface with member 28. Members 28 and 32 are fabricated—for example—of fused silica. The star image is reflected from silvered surface 34 through negative lenses 36 and 38 and air column 40 to a photo detector 42 in the focal plane of the telescope. The electronics associated with photo detector 42 may be packaged in housing 44.

Photo detector 42 is preferably a substrate member such as—for example—ceramic or glass with photoelectric surfaces displayed in a predetermined geometrical pattern. The photosensitive surfaces, in one preferred embodiment of this invention are made of cadmium sulfide.

FIGURES 3 through 11 show various embodiments of the photoelectric detector 42 of this invention.

Figure 3:
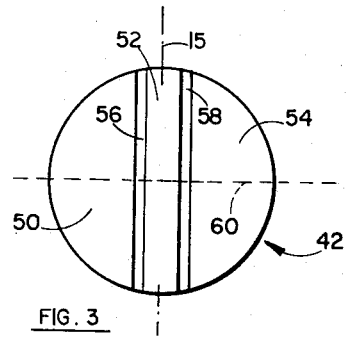
FIGURE 3 is a plan view of a typical sensing element adapted to measure the position of a star image about one axis of the telescope of FIGURE 1.
Figure 4:
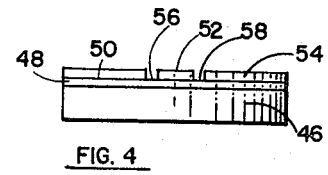
FIGURE 4 is a side view of the device of FIGURE 3.

The embodiment shown in FIGURES 3 and 4 serves to explain the basic idea of the present invention.

In FIGURES 3 and 4, a substrate 46 fabricated—for example—of ceramic or glass is adapted to support a photoelectric surface. In one embodiment of this invention, a photoelectric surface of cadmium sulfide 48 is placed over the entire surface of the substrate 46 and is then masked with gold to display two parallel surfaces 56 and 58 of photoelectric material. Alternatively, two parallel photoelectric surfaces 56 and 58 may be placed directly on substrate member 46. In any event, the parallel strips of photoelectric material 56 and 58 are positioned on substrate 46 so that when telescope 10 rocks about axis 15 the star image is caused to follow a trajectory 60, to intercept consecutively one and then the other of the two photoelectric surfaces 56 and 58.

As can be readily seen, the rocking of telescope 10 about axis 15 will provide an accurate measure of the position of the star image along axis 60. Assume first that when telepscope 10 is aimed in the known direction of a predetermined star, the star image falls directly on axis 60, half way between the surfaces 56 and 58. Then, when the dithering begins, there will be an equal excursion of the star's image to the left and to the right of the center of the focal plane. As a result, the time spacing between the pulse pair obtained on a left to right scan of the telescope and the pulse pair obtained on a right to left scan of the telescope will equal the time spacing between the pulse pair obtained on a right to left scan and the pulse pair obtained on a left to right scan. In other words, a constant pulse repetition frequency between consecutive pairs of pulses indicates that the star image is centered.

Now assume that the star image again falls on axis 60 but to the right of surface 58. Now when the dithering begins, the scan from the center to the right and back will not encounter either of the photoelectric surfaces whereas the scan from the center to the left and back will encounter each surface twice. As a result, the pulse spacing between consecutive pairs will not be equal indicating that the star image is not centered. A conventional follow-up system may be employed to sense the inequality in the pulse repetition frequency and to provide a signal to motor 16 or 20 to reorient telepscope 10 until the star image is centered.

Figure 5:
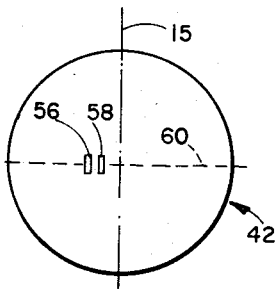
FIGURE 5 is an alternative embodiment of the device of FIGURE 3.

In the modification shown in FIGURE 5, the surfaces 56 and 58 are shown with a smaller area extension in the direction of axis 15 than that set forth in FIGURE 3. It is apparent that providing more area to elements 56 and 58 increases the background noise caused by ambient illumination. Thus, the areas 56 and 58 should not be extended in the direction of axis 15 farther than that necessary to accommodate the farthest predictable excursion of the star image in that direction.

Figure 6:
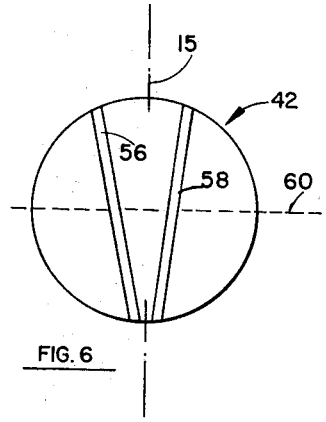
FIGURE 6 is a second alternative embodiment of the device of FIGURE 3.

In the embodiment of FIGURE 6 photoelectric surfaces 56 and 58 converge. This permits two axis centering with only single axis dithering. Centering along an axis parallel to axis 60 is obtained in the same manner described above with reference to FIGURE 3. Further, the difference in time between the signals generated by the interception of the star signal with areas 56 and 58 in the embodiment of FIGURE 6 can be used as a measure of the excursion of the star image in the direction of axis 15. In other words, the star's vertical bearing can be obtained by comparing the time difference between the positive and negative pulses along a single scan with the time difference between positive and negative pulses produced by a hypothetical light source traversing axis 60.

Figure 7:
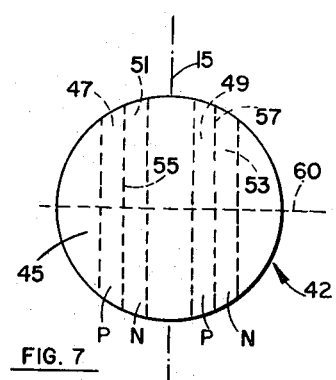
FIGURE 7 is a third alternative embodiment of the device of FIGURE 3 using a pair of semi-conductor photosensitive devices.

An alternative embodiment of a single axis detector is shown in FIGURE 7. In FIGURE 7, a substrate 45 may—for example—be of silicon. Strips 47 and 49 may be P type silicon. Strips 51 and 53 may be N type silicon. Other materials may be used to form photosensitive P-N junctions. A voltage is generated between 47 and 51 when a star image crosses junction 55. Similarly a voltage is generated betwen 49 and 53 when a star image crosses junction 57.

Figure 8:
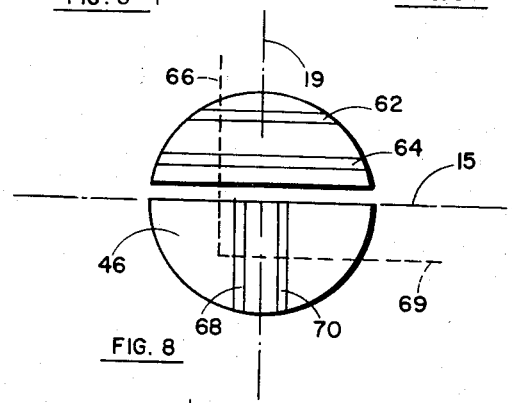
FIGURE 8 is a photoelectric sensor adapted to be used in this invention to detect the distance and direction, about two axes, of the star image in the focal plane of the telescope of FIGURE 1.

In the embodiment of FIGURE 8, a first pair of parallel photoelectric sensitive areas 62 and 64 are positioned upon the substrate 46 to detect the excursion of the star image along trajectory 66 due to motion of telescope 10 about axis 15. A second pair of parallel sensing areas 68 and 70 are supported by substrate 46 to detect the motion of the star image along trajectory 69. In use of the embodiment of FIGURE 8, the star image is first swept in a direction shown by trajectory 66 then in a direction shown by trajectory 69. The motion of the star image in the direction of trajectory 69 is caused by motion of the telescope 10 about axis 19.

Figure 9:
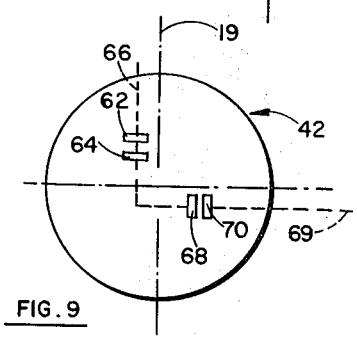
FIGURE 9 is an alternative embodiment of the device of FIGURE 8.

For the reasons set forth above in connection with the discussion of FIGURE 5, the areas 62, 64, 68 and 70 are preferably reduced in size as shown in FIGURE 9.

Figure 10:
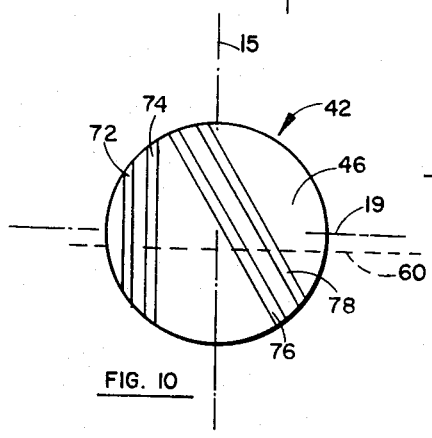
FIGURE 10 is another photosensor in accordance with this invention adapted to generate signals which are a measure of the distance and direction, about two axes, of the star image from the optical axis of the telescope of FIGURE 1.

In FIGURE 10, a first pair of parallel photoelectric surfaces 72 and 74 are positioned on substrate 46 to intercept the trajectory of a star image 60 due to rotation of telescope 10 about axis 15. A second pair of photosensitive surfaces 76 and 78 are supported by substrate 46 at an angle with the surfaces 72 and 74. Displacement of trajectory 60 in the direction of axis 15 due to misalignment of the telepscope about axis 19 causes the first interception of photosensitive surfaces 76 and 78 to vary with that displacement to cause the timing of the resultant signal generated by the interception of surfaces 76 and 78 to be a measure of the displacement of trajectory 60 in the direction of axis 15.

Figure 11:
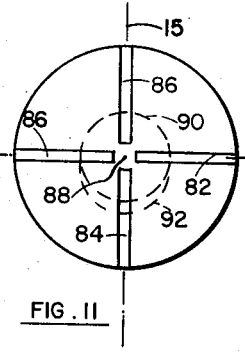
FIGURE 11 is another star sensor adapted to be used in this invention to detect the position of the star image, about two axes, in the focal plane of the telescope of FIGURE 1.

In FIGURE 11, four photoelectric sensing strips 80, 82, 84 and 86 are radially displayed symmetrically about a point 88 in the focal plane of telescope 10. The point 88 is usually the optical axis of the telescope 10. Strips 88, 82, 84, and 86 are angularly displaced about point 88 relative to each other by 90°. The telescope is dithered in a circular motion to cause a star image to follow typical circular orbits such as orbits 90 and 92. Sensors 80 and 84 are connected in one electrical bridge (not shown) and sensors 82 and 86 are connected in another electrical bridge (not shown). The timing of the pulses generated by the two bridges is a measure of the displacement of orbits 90 and 92 due to misalignment of the telescope about axis 15 or axis 19.

Figure 12:
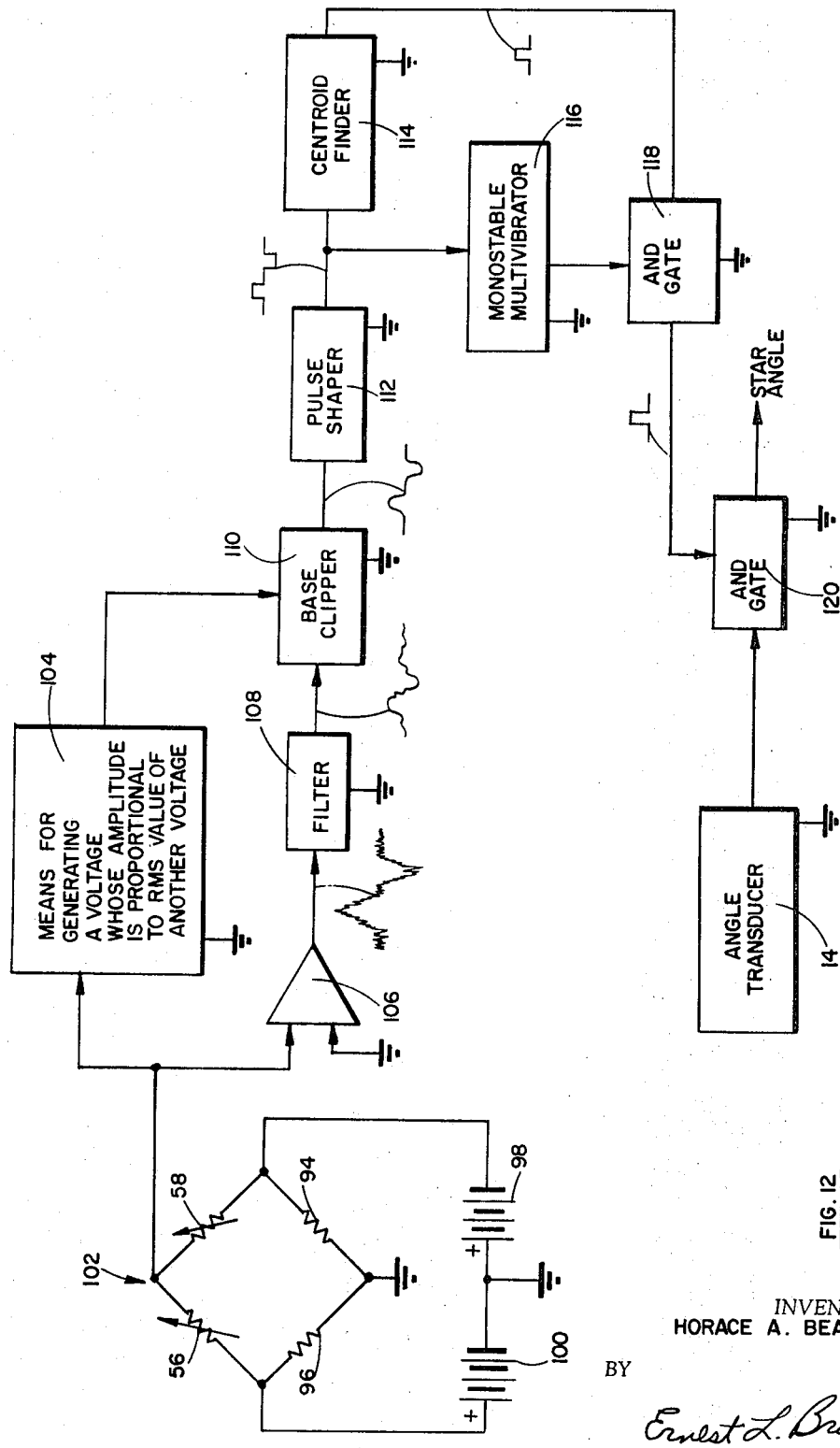
FIGURE 12 is a block diagram of typical electronics adapted to be used in this invention to generate a signal which is indicative of the presence of a star image on the focal plane of the telescope of FIGURE 1 and to register a measure of the angular position of the star image about one axis of the telescope of FIGURE 1.

A typical circuit for use with a single axis sensor such as that in FIGURES 3, 4, 5, 6 and 7 and such as that used on each of the two axes of FIGURES 8 and 9 is shown in FIGURE 12. In FIGURE 12, two photosensitive resistors 56 and 58 are connected in a bridge with two equal resistors 94 and 96. The bridge is excited by a pair of voltage sources 98 and 100. The output of the bridge 102 is connected to the input of means 104 for generating a voltage whose amplitude is proportional to the RMS value of another voltage.

Means 104 may be—for example— a circuit which has an ability to square the input voltage and to integrate the squared voltage over predetermined interval of time. Alternatively, means 104 may be a rectifier and filter.

The output of bridge 102 is also connected through amplifier 106 to the input of a filter 108. Filter 108 is preferably a low pass filter or a band pass filter which is adapted to reject noise and to pass signals at the frequency of the sweep of the star image across sensors 56 and 58. The output of filter 108 is connected to the input of base clipper 110. The purpose of base clipper 110 is to determine if there is a star image at all. If the signal from filter 108 is above an arbitrary clipping level, then that pulse represents a star image and is not just background noise. The optimum clipping level changes with the RMS value of the noise signal so that means 104 is provided to control the clipping level of clipper 110.

The output of base clipper 110 is connected through pulse shaper 112 to generate a square wave. Pulse shaper 112 may be—for example—an amplifier and a peak clipper.

The output of pulse shaper 112 still has some time jitter due to noise which is eliminated by applying this output to the input of a centroid finder 114. Centroid finder 114 may be—for example—similar to that described in patent application Ser. No. 843,534 entitled "Centroid Finder" by W. D. Ashcraft which is assigned to the same assignee as the present application.

Centroid finder 114 is operative to produce a narrow pulse which comes a fixed time ($T_L$) after the centroid of the first of each star pulse pair.

The output of pulse shaper 112 is also connected to control monostable multivibrator 116 which is triggered by the second pulse of the two pulse train appearing at the output of pulse shaper 112.

The output of monostable multivibrator 116 and the output of centroid finder 114 are connected to AND gate 118. Provided the output of the centroid finder 114 appears within a predetermined time after the monostable multivibrator 116 is triggered, the signal from centroid finder 114 is passed through AND gate 118. This is arranged by adjusting $T_L$ to slightly exceed the maximum expected time spacing between consecutive positive and negative pulses of a pair and by adjusting the triggered duration time of multivibrator 116 such that it will encompass the output of centroid finder 114 throughout its range of possible occurrence times.

In a first embodiment, angle transducer 14 is adapted to generate a signal which is a measure of the angular position of telescope 10 about axis 15. The signal generated by angle transducer 14 may—for example—be in binary digital form. The output of angle transducer 14 is connected through an AND gate 120 to generate a signal, at the output of AND gate 120, which is a measure of the angular position of the telescope about axis 15 precisely at the time the image of the star was halfway between photosensor 56 and photosensor 58. A slight time delay through the electronics may be compensated by biasing the output signal of angle transducer 14.

In operation, motor 16 and motor 20 drive telescope 10 substantially to the position where the image of a predetermined star appears on the optical axis of the telescope. The means for determining the position of the star and its coordinates and for driving the telescope to these coordinates are not a part of this invention. After the telescope is positioned, it is swept over a small arc about axis 15 then over a small arc about axis 19. During the sweep about axis 15 the star image intercepts photoelectric surfaces 62 and 64. Then during the sweep about axis 19 the image intercepts surfaces 68 and 70. Each of the axes is connected to electronic circuitry similar to that set forth in FIGURE 12.

The operation of the circuitry of FIGURE 12 will suffice to describe the operation of the circuitry associated with FIGURES 8 and 9. When the star image intercepts (in FIGURE 3) surfaces 56 and 58, voltages of opposite polarity are generated at the output of bridge 102. A voltage which is a measure of the RMS voltage at the output of bridge 102 is generated at the output of means 104 for generating a voltage whose amplitude is proportional to the RMS of another voltage. The voltage at the output of bridge 102 is also amplified by amplifier 106. Undesirable frequency components are removed by filter 108. The base clipper 110 clips off the base of the signal from the output of filter 108 to cause the signals generated by the star image to become more pronounced. Only signals of greater amplitude than the amplitude of voltage generated by means 104 is passed by base clipper 110. Pulse shaper 112 changes the signals generated by the star image into square waves. Centroid finder 114 finds the centroid of the first pulse of the pair of pulses which appear at the output of pulse shaper 112. Monostable multivibrator 116 is triggered by the second pulse of the two pulse train that comes out of pulse shaper 112 to open gate 118 to allow the centroid pulse from the output of centroid finder 114 to appear at the output of AND gate 118.

Angle transducer 14 generates a signal which is a measure of the position of the star tracker about axis 15. When AND gate 118 is opened, the signal from angle transducer 14 appears at its output terminals as a measure of the position of the star image relative to the optical axis of telescope 10.

In the device of FIGURE 7, when the star image crosses junction 55—for example, from left to right—a current pulse is generated through the junction. As the star image crosses junction 57, a current pulse is generated through that junction. The two current pulses are used to identify the presence of a star image in the same fashion as the voltage pulses generated in the bridge of resistors 56 and 58.

Figure 13:
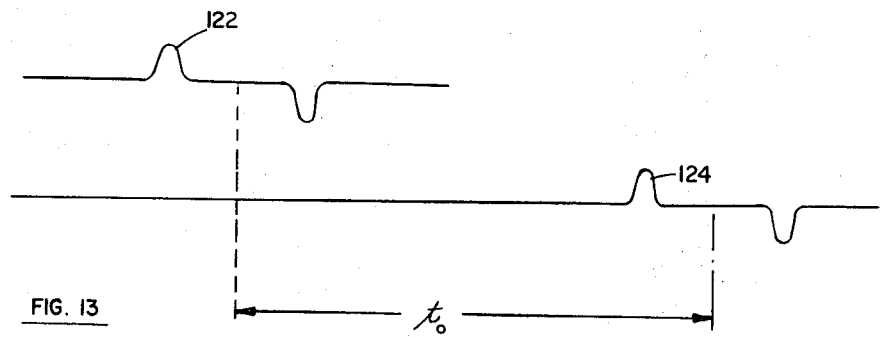
FIGURE 13 is a sketch of a pair of typical wave forms which might be generated by a pair of bridges connected to the photoelectric sensors of FIGURE 10 to generate measures of star position about two axes of the telescope of FIGURE 1.

In FIGURE 13 is shown typical signals which are generated by photosensitive surfaces 72, 74 and by photosensitive surfaces 76 and 78. Signal 122 is typical of the signal generated by photosensitive surfaces 72 and 74. Signal 124 is typical of the signal generated by photosensitive surfaces 76 and 78. The time between the centers of the pulse pairs, $t_0$, is a measure of the displacement of the star image in the direction of axis 15 about axis 19.

Figure 14:
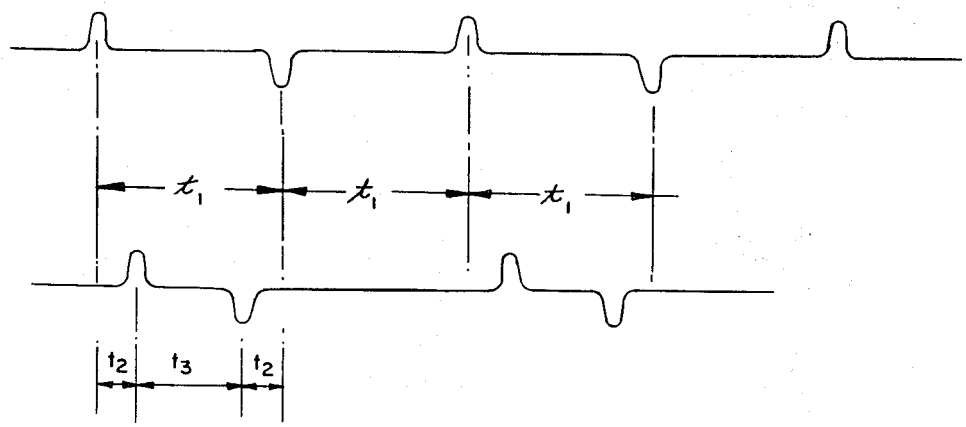
FIGURE 14 is a sketch of typical wave forms which might be generated by two radially opposite photosensors of the device of FIGURE 11 when connected in a bridge.

When a circular scan is used, if—for example—the scan is as shown by the trajectory 90, the signals at the output of a bridge of photosensitive members 80 and 84 would generate pulses which are equally spaced as shown by $t_1$ in FIGURE 14. However, if the trajectory were displaced as shown at 92, the pulses would bunch up as shown by $t_3$, in FIGURE 14, the bunching being a measure of the displacement of the circular orbit in the direction of axis 15 about axis 19.

Thus, the device of this invention has been described particularly with the view toward achieving increased recognition of the presence of a star image, together with electronic equipment which is adapted to operate with the novel photoelectric configurations of this invention to generate a measure of the magnitude and sense of misalignment of the optical axis of telescope 10.

Although the device of this invention has been described in detail above it is not intended that the invention should be limited by that description but only in accordance with the spirit and scope of the appended claims in which I claim:

1. In a telescope tracking system wherein an image of an object to be tracked is directed onto the focal plane of the telescope, and wherein said telescope is adapted to reciprocate to sweep the image along a predetermined straight line trajectory across said focal plane, means for determining the distance and direction of said image from the center of said focal plane comprising:
   a photodetector located at said focal plane for detecting said image, said photodetector comprising,
   a pair of elongated substantially rectangular photoelectric strip surfaces for providing output signals in response to illumination, said surfaces being arranged so as to converge whereby dithering of said telescope about a single axis which intersects both of said surfaces permits centering of said image along said single axis and along another axis which is perpendicular to said single axis;
   means for dithering said telescope to cause said image to sweep consecutively across said photoelectric surfaces;
   means for differentially combining the output signals from said pair of photoelectric surfaces; and
   means operatively coupled to said combining means for sensing the times of occurrence of said output signals and for determining the position of said image based upon said time.

2. In a telescope tracking system wherein an image of an object to be tracked is directed onto the focal plane of the telescope, and wherein said telescope is adapted to reciprocate to sweep the image along a predetermined straight line trajectory across said focal plane, means for determining the distance and direction of said image from the center of said focal plane comprising:
   a photodetector located at said focal plane for detecting said image, said photodetector comprising
   first and second pairs of closely spaced elongated substantially rectangular photoelectric strip surfaces for providing output signals in response to illumination, the photoelectric surfaces of said first pair being arranged substantially parallel to each other and intersecting said trajectory, the photoelectric surfaces of said second pair being arranged substantially parallel to each other and convergent with said first pair;
   means for dithering said telescope to cause said image to sweep consecutively across said photoelectric surfaces whereby dithering of said telescope about a single axis which intersects both of said pairs of surfaces permits centering of said image along said single axis and along another axis which is perpendicular to said single axis;
   first means for differentially combining the output signals from said first pair of photoelectric surfaces, and second means for differentially combining the output signals from said second pair of photoelectric surfaces; and
   means operatively coupled to said combining means for sensing the time duration between occurrence of said first differentially combined output and said second differentially combined output and for determining the position of said image based upon said time duration.

References Cited
UNITED STATES PATENTS

| | | | |
|---|---|---|---|
| 1,747,664 | 2/1930 | Droitcour | 88—1 |
| 2,513,367 | 7/1950 | Scott | 250—203 |
| 2,952,779 | 9/1960 | Talley | 250—203 X |
| 2,994,780 | 8/1961 | Wilcox | 250—203 |
| 3,028,499 | 4/1962 | Farrall | 88—23 X |
| 3,098,934 | 7/1963 | Wilson et al. | 88—1 X |
| 3,107,300 | 10/1963 | Stanley et al. | 88—1 X |
| 3,162,764 | 12/1964 | Haviland | 250—203 X |
| 3,185,852 | 5/1965 | Lewis | 88—1 X |

JEWELL H. PEDERSEN, *Primary Examiner.*

O. B. CHEW, *Assistant Examiner.*